US010264350B2

(12) United States Patent
Kanamori et al.

(10) Patent No.: US 10,264,350 B2
(45) Date of Patent: Apr. 16, 2019

(54) SOUND SOURCE PROBING APPARATUS, SOUND SOURCE PROBING METHOD, AND STORAGE MEDIUM STORING PROGRAM THEREFOR

(71) Applicant: Panasonic Intellectual Property Corporation of America, Torrance, CA (US)

(72) Inventors: Takeo Kanamori, Osaka (JP); Kohhei Hayashida, Kyoto (JP); Shintaro Yoshikuni, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/898,896

(22) Filed: Feb. 19, 2018

(65) Prior Publication Data
US 2018/0255395 A1  Sep. 6, 2018

Related U.S. Application Data

(60) Provisional application No. 62/466,498, filed on Mar. 3, 2017.

(30) Foreign Application Priority Data

Nov. 9, 2017  (JP) .................. 2017-216735

(51) Int. Cl.
*H04R 3/00* (2006.01)
*H04R 1/32* (2006.01)
(Continued)

(52) U.S. Cl.
CPC .............. *H04R 1/32* (2013.01); *G01S 3/8083* (2013.01); *G01S 17/023* (2013.01); *G01S 17/08* (2013.01); *G10L 25/78* (2013.01); *G10L 25/84* (2013.01)

(58) Field of Classification Search
CPC ....... H04R 1/32; G01S 3/8083; G01S 17/023; G01S 17/08; G10L 25/78; G10L 25/84
See application file for complete search history.

(56) References Cited

U.S. PATENT DOCUMENTS

2013/0083942 A1* 4/2013 Ahgren et al. ........ G01S 3/8006
381/92
2014/0072142 A1 3/2014 Nakadai et al.

FOREIGN PATENT DOCUMENTS

JP  2014-056181  3/2014

OTHER PUBLICATIONS

Extended European Search Report, dated Apr. 4, 2018, by the European Patent Office (EPO) for the related European Patent Application No. 18157565.5.

(Continued)

Primary Examiner — Andrew L Sniezek
(74) Attorney, Agent, or Firm — Greenblum & Bernstein, P.L.C.

(57) ABSTRACT

A sound source probing apparatus, including storage and processing circuitry, is provided that probes a direction of a sound source. The processing circuitry performs operations including determining a first correlation matrix that is a correlation matrix of acoustic signals acquired as observation signals by a microphone array including two or more microphones disposed apart from each other. The operations also include determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in the storage. The operations further include deter- (Continued)

mining, using the determined weights, a spatial spectrum of the observation signal indicating sound pressure intensities in the respective directions.

9 Claims, 9 Drawing Sheets

(51) Int. Cl.
*G10L 25/78* (2013.01)
*G10L 25/84* (2013.01)
*G01S 3/808* (2006.01)
*G01S 17/02* (2006.01)
*G01S 17/08* (2006.01)

(56) References Cited

OTHER PUBLICATIONS

Johannes Traa et al.: "Directional NMF for Joint Source Localization and Separation", 2015 IEEE Workshop on Applications of Signal Processing to Audio and Acoustics (WASPAA), IEEE, Oct. 18, 2015 (Oct. 18, 2015), pp. 1-5, XP032817999.

Kamil Adiloglu et al.: "Online Estimation of Inter-Channel Phase Differences Using Non-Negative Matrix Factorization", 2016 IEEE 26th International Workshop on Machine Learning for Signal Processing (MLSP), IEEE, Sep. 13, 2016 (Sep. 13, 2016), pp. 1-6, XP032996300.

* cited by examiner

SOUND SOURCE PROBING APPARATUS, SOUND SOURCE PROBING METHOD, AND STORAGE MEDIUM STORING PROGRAM THEREFOR

BACKGROUND

1. Technical Field

The present disclosure relates to a sound source probing apparatus, a sound source probing method, and a storage medium storing a program therefor.

2. Description of the Related Art

For example, Japanese Unexamined Patent Application Publication No. 2014-56181 discloses a sound source direction estimation apparatus capable of accurately estimating a direction of a sound source based on a plurality of acoustic signals acquired a plurality of microphone units. In this technique disclosed in Japanese Unexamined Patent Application Publication No. 2014-56181, noise is handled using a correlation matrix of noise signals based on a plurality of acoustic signals thereby making it possible to accurately estimate the direction of the sound source from the plurality of acoustic signals.

SUMMARY

In the technique disclosed in Japanese Unexamined Patent Application Publication No. 2014-56181, the correlation matrix of the noise signals is calculated based on the plurality of acoustic signals acquired as observation signals by the plurality of microphone units. Therefore, when a noise source and a sound source to be probed both exist simultaneously or when the level of noise is higher than the level of a sound source to be probed, it is difficult to determine an accurate correlation matrix including only noise components. That is, in the technique in which a sound source probing is performed based on a signal phase difference between a plurality of acoustic signals acquired via a plurality of microphone units, there is a problem that when there is noise with a sound pressure level higher than the sound pressure level of a sound source, an influence of the noise may make it difficult to detect the sound source to be probed.

One non-limiting and exemplary embodiment provides a sound source probing apparatus capable of surely probing a direction of a sound source located in a probing range.

In one general aspect, the techniques disclosed here feature a sound source probing apparatus, that probes a direction of a sound source, including storage, and processing circuitry that, in operation, performs operations including determining a first correlation matrix that is a correlation matrix of acoustic signals acquired as observation signals by a microphone array including two or more microphones disposed apart from each other, determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in the storage, and determining, using the determined weights, a spatial spectrum of the observation signal indicating sound pressure intensities in the respective directions.

According to the present disclosure, it is possible to achieve a sound source probing apparatus or the like capable of surely probing a direction of a sound source existing in a probing range.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
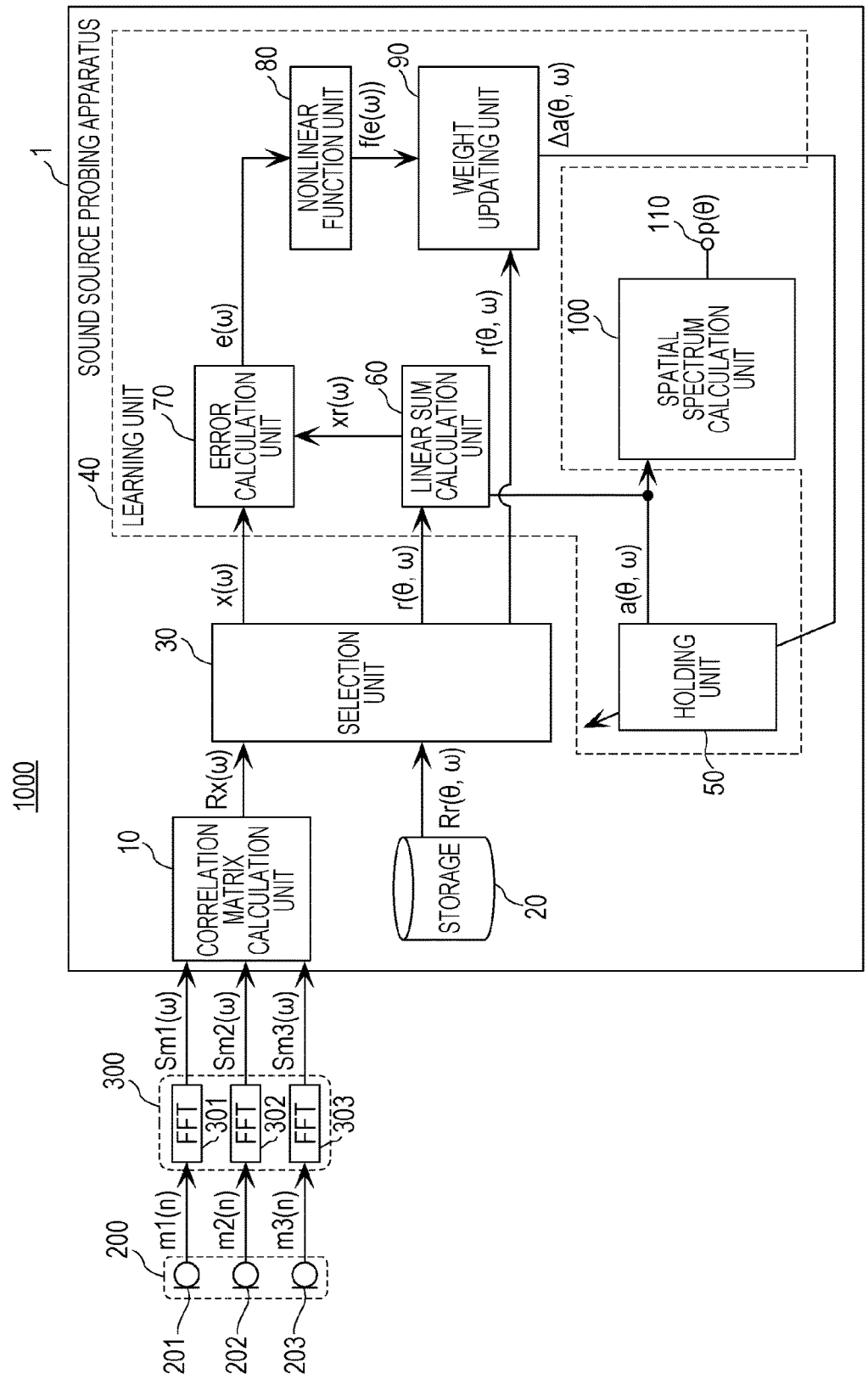
FIG. 1 is a diagram illustrating an example of a configuration of sound source probing system according to a first embodiment.

In an aspect, a sound source probing apparatus, that probes a direction of a sound source, includes storage, and processing circuitry that, in operation, performs operations including determining a first correlation matrix that is a correlation matrix of acoustic signals acquired as observation signals by a microphone array including two or more microphones disposed apart from each other, determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in the storage, and determining, using the determined weights, a spatial spectrum of the observation signal indicating sound pressure intensities in the respective directions.

In this aspect, it is assured that it is possible of probing a direction of a sound source existing in a probing range. Furthermore, since the spatial spectrum of the observation signal is determined using the weights determined via the learning, it is possible to achieve the sound source probing apparatus having the high noise immunity performance and the high performance in terms of the quick response to a change in sound.

In the sound source probing apparatus, the operations may further include selecting one first element from elements of the first correlation matrix and also selecting one second element from elements of each of the second correlation matrices such that each second element is at a matrix element position corresponding to a matrix element position of the first element, and sequentially changing the first element and the second elements by changing the matrix element position at which the first and second elements are selected, and wherein the determining of the weights may include updating the weights from first values to second values that allow a linear sum of the second elements multiplied by the respective second values of the weights to be equal to the first element, updating the weights from the second values to third values that allow a linear sum of next-selected second elements multiplied by the respective third values of the weights to be equal to a next-selected first element, and further repeating the updating of the values of the weights each time the first element and the second elements are changed thereby determining the weights.

In this aspect it is possible to determine, via the learning, the weights that allow the above-described equality to be achieved at the same time for each of all combinations of the matrix element of the first correlation matrix and the corresponding matrix elements of the plurality of the second correlation matrix, and thus it is ensured that it is possible to prove the direction of the sound source existing in the probing range based on the acoustic signals detected by the microphone array including three or more microphones.

In the sound source probing apparatus, in the selecting, the first element and the second elements may be selected only from either one of two groups of elements of respective correlation matrices including the first correlation matrix and the second correlation matrices, the two groups of elements of each correlation matrix being defined such that the correlation matrix is divided into the two groups by a boundary defined by diagonal elements such that each group includes a plurality of elements but does not include the diagonal elements.

This allows a reduction in the amount of calculation, and thus it becomes possible to probe, at a higher detection speed, the direction of the sound source existing in the probing range.

In the sound source probing apparatus, in the determining of the weights, the weights may be determined based on the second correlation matrix and an error between the linear sum and the first correlation matrix using an LMS (Least Mean Square) algorithm or ICA (Independent Component Analysis).

In this aspect, it is possible to determine the intensities in respective directions while cancelling out influences by other directions, and thus it is possible to achieve the sound source probing apparatus having the high noise immunity performance.

In the sound source probing apparatus, the determining of the weights may include holding the weights, determining a linear sum of the products of the second correlation matrices and the respective held weights, determining an error defined by the difference between the linear sum and the first correlation matrix, determining weight change amounts from the error and the products of the second correlation matrices and the weights, and updating the weights by addling the weight change amounts to the respective held weights.

In the sound source probing apparatus, in the determining of the weights, the weight change amounts may be determined from the error and the second correlation matrices using an LMS algorithm or ICA.

In the sound source probing apparatus, the determining of the weights may further include adding nonlinearity to the error using a predetermined nonlinear function, and in the determining of the update amounts, the weight change amounts are determined from the error added with the nonlinearity and the second correlation matrices.

In this aspect, the adding of the nonlinearity to the determined error makes it possible to reduce the influence among directions, and thus it is possible to achieve the sound source probing apparatus having the high noise immunity performance.

In another aspect, a method of probing a direction of a sound source includes determining a first correlation matrix that is a correlation matrix of acoustic signals acquired as observation signals by a microphone array including two or more microphones disposed apart from each other, determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in storage, and determining, using the determined weights, a spatial spectrum of the observation signal indicating sound pressure intensities in the respective directions.

In another aspect, in a computer-readable non-transitory storage medium storing a program for causing a computer to execute a method of probing a direction of a sound source, the program, when executed by the computer, causes the computer to execute the method including determining a first correlation matrix that is a correlation matrix of acoustic signals acquired as observation signals by a microphone array including two or more microphones disposed apart from each other, determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in storage, and determining, using the determined weights, a spatial spectrum of the observation signal indicating sound pressure intensities in the respective directions.

It should be noted that general or specific embodiments may be implemented as a system, a method, a computer program, or computer-readable storage medium such as a CD-ROM disk, or any selective combination of a system, a method, a computer program, and computer-readable storage medium.

A sound source probing apparatus according to an embodiment is described in detail below with reference to drawings. Note that each embodiment described below is for illustrating a specific example of an implementation of the present disclosure. That is, in the following embodiments of the present disclosure, values, shapes, materials, constituent elements, locations of constituent elements and the like are described by way of example but not limitation. Among constituent elements described in the following embodiments, those constituent elements that are not described in independent claims indicating highest-level concepts of the present disclosure are optional. Also note that various combinations of part or all of embodiments are possible.

First Embodiment

FIG. 1 is a diagram illustrating an example of a configuration of a sound source probing system 1000 according to a first embodiment. The sound source probing system 1000 is used to probe a direction of a sound source. In the present embodiment, as illustrated in FIG. 1, the sound source probing system 1000 includes a sound source probing apparatus 1, a microphone array 200, and a frequency analysis unit 300.

Microphone Array 200

Figure 2:
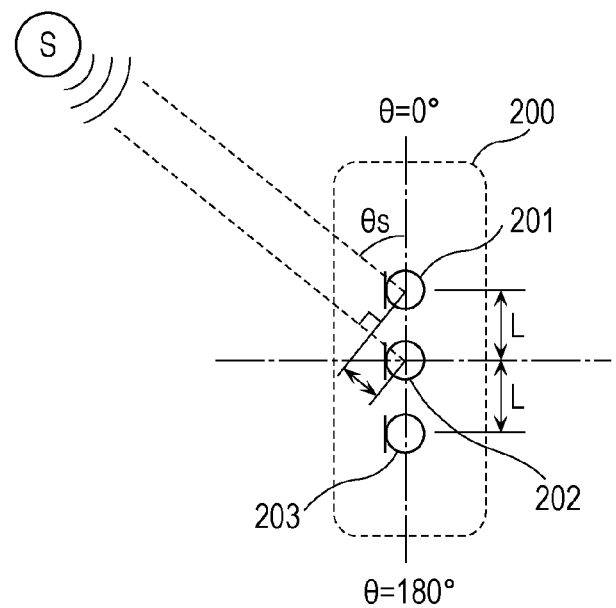
FIG. 2 is a schematic diagram illustrating a positional relationship between a microphone array according to the first embodiment and a sound source direction in which a sound source exists.
Figure 3:
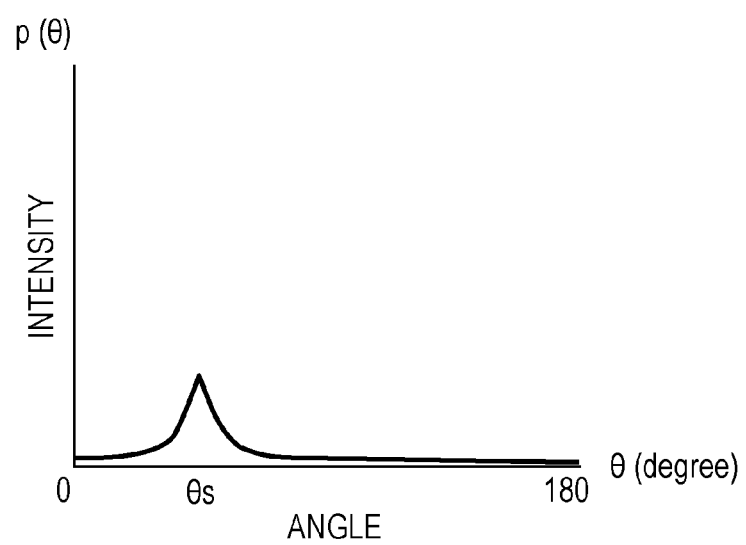
FIG. 3 is a diagram illustrating a spatial spectrum of an observation signal observed by the microphone array in a state in which the positional relationship is as illustrated in FIG. 2.

The microphone array 200 includes two or more microphone units disposed apart from each other. The microphone array 200 observes, that is, detects acoustic waves coming from all directions, and outputs electric signals converted from acoustic signals. In the following description of the present embodiment, it is assumed by way of example that the microphone array 200 includes three microphone units, that is, microphone units 201, 202, and 203. The microphone unit 201, the microphone unit 202, and the microphone unit 203 each are, for example, a nondirectional microphone having a high sensitivity to an acoustic pressure, and they are disposed apart from each other (in other words, they are disposed at different locations). The microphone unit 201 outputs an acoustic signal m1($n$) which is a time-domain signal acquired as a result of converting a sensed acoustic wave to an electric signal. Similarly, the microphone unit 202 outputs an acoustic signal m2($n$) which is a time-domain signal acquired as a result of converting a sensed acoustic wave to an electric signal, and the microphone unit 203 outputs an acoustic signal m3($n$) which is a time-domain signal acquired as a result of converting a sensed acoustic wave to an electric signal, FIG. 2 is a schematic diagram illustrating a positional relationship between the microphone array 200 according to the first embodiment and a sound source direction in which a sound source S exists. FIG. 3 is a diagram illustrating a spatial spectrum of an observation signal observed by the microphone array 200 in a state in which the positional relationship is as illustrated in FIG. 2. As illustrated in FIG. 2, the microphone array 200 is configured in the form of an array arrangement in which the microphone unit 201, the microphone unit 202, and the microphone unit 203 are arranged in line along an axis of θ=0°. As also illustrated in FIG. 2, the sound source S exists in a direction at an angle of θ=θs with respect to the microphone array 200. In this example, there is no sound source generating a disturbing sound. In this case, a spatial spectrum is obtained as a result of probing by the sound source probing apparatus 1 as illustrated in FIG. 3. In the spatial spectrum obtained as the result of the probing illustrated in FIG. 3, a greatest intensity appears at an angle θs.

Frequency Analysis Unit 300

The frequency analysis unit 300 converts the acoustic signals observed by the respective two or more microphone units to frequency-domain signals and outputs results as frequency spectrum signal. More specifically, the frequency analysis unit 300 performs frequency analysis on the acoustic signals input from the microphone array 200, and outputs frequency spectrum signals which are frequency-domain signals. The frequency analysis may be performed using a technique of converting a time-domain signal to amplitude information and phase information as a function of frequency, such as fast Fourier transform (FFT), discrete Fourier transform (DFT), etc.

In the present embodiment, the frequency analysis unit 300 includes an FFT 301, an FFT 302, and an FFT 303, which respectively perform a fast Fourier transform. The FFT 301 receives an input of an acoustic signal m1($n$) output from the microphone unit 201, and converts the input acoustic signal m1($n$) from a time domain to a frequency domain using the fast Fourier transform. The FFT 301 outputs a resultant frequency spectrum signal Sm1($\omega$). The FFT 302 receives an input of an acoustic signal m2($n$) output from the microphone unit 202, and converts the input acoustic signal m2($n$) from a time domain to a frequency domain using the fast Fourier transform. The FFT 302 outputs a resultant frequency spectrum signal Sm2($\omega$). The FFT 303 receives an input of an acoustic signal m3($n$) output from the microphone unit 203, and converts the input acoustic signal m3($n$) from a time domain to a frequency domain using the fast Fourier transform. The FFT 303 outputs a resultant frequency spectrum signal Sm3($\omega$).

Sound Source Probing Apparatus 1

Figure 4:
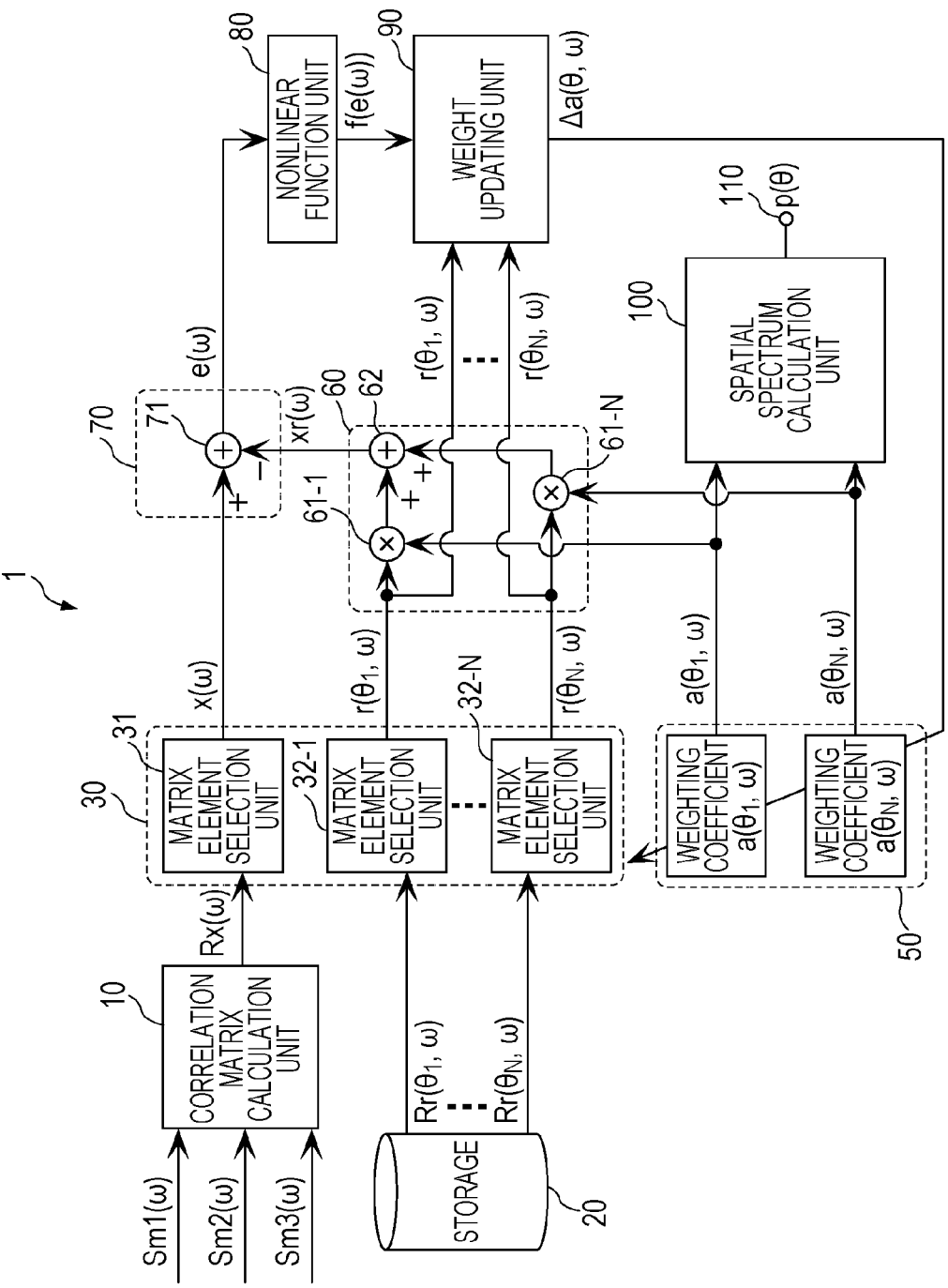
FIG. 4 is a diagram illustrating an example of a detailed configuration of the sound source probing apparatus illustrated in FIG. 1.

FIG. 4 is a diagram illustrating an example of a detailed configuration of the sound source probing apparatus 1 illustrated in FIG. 1.

The sound source probing apparatus 1 probes a direction of a sound source. In the present embodiment, the sound source probing apparatus 1 includes, as illustrated in FIG. 1 and FIG. 4, a correlation matrix calculation unit 10, storage 20, a selection unit 30, a learning unit 40, a spatial spectrum calculation unit 100, and an output unit 110. Note that the sound source probing apparatus 1 may not include the selection unit 30 when the microphone array 200 includes only two microphone units. Also note that the microphone array 200 and the frequency analysis unit 300 may be included in the sound source probing apparatus 1. Each constituent element is described below.

Correlation Matrix Calculation Unit 10

The correlation matrix calculation unit 10 calculates a first correlation matrix, that is, a correlation matrix of observation signals which are acoustic signals collected by the microphone array 200. In the present embodiment, the correlation matrix calculation unit 10 calculates an observation correlation matrix Rx($\omega$) as the first correlation matrix from the frequency spectra output from the frequency analysis unit 300. More specifically, the correlation matrix calculation unit 10 calculates the observation correlation matrix Rx($\omega$) from the frequency spectrum signal Sm1($\omega$) input from the FFT 301, the frequency spectrum signal Sm2($\omega$) input from the FFT 302, and the frequency spectrum signal Sm3($\omega$) input from the FFT 303 according to equations (1) and (2) described below.

Elements $X_{ij}(\omega)$ of the observation correlation matrix Rx($\omega$) are acoustic waves that arrive at the respective microphone units and the elements $X_{ij}(\omega)$ have phase difference information on a plurality of acoustic waves coming from a plurality of sound sources existing in an actual environment. For example, an element $X_{12}(\omega)$ in equation (1) represents phase difference information on a phase difference between acoustic waves arriving at the microphone unit 201 and the microphone unit 202. For example, an element $X_{13}(\omega)$ in equation (1) represents phase difference information on a phase difference between acoustic waves arriving at the microphone unit 201 and the microphone unit 203. In equation (2), (·)* denotes complex conjugate.

$$Rx(\omega) = \begin{bmatrix} x_{11}(\omega) & x_{12}(\omega) & x_{13}(\omega) \\ x_{21}(\omega) & x_{22}(\omega) & x_{23}(\omega) \\ x_{31}(\omega) & x_{32}(\omega) & x_{33}(\omega) \end{bmatrix} \quad (1)$$

$$x_{ij}(\omega) = \frac{Sm_i(\omega) * Sm_j(\omega)}{|Sm_i(\omega)||Sm_j(\omega)|} \quad (2)$$

In the present embodiment, in a case where the microphone units denoted as the microphone units 201 to 203 have sound pressure sensitivity characteristics which are substantially flat and substantially equal to each other, the elements $X_{ij}(\omega)$ of the observation correlation matrix $Rx(\omega)$ can be described by equation (3). Note that each element $X_{ij}(\omega)$ of the observation correlation matrix $Rx(\omega)$ is equivalent to a value obtained by eliminating the normalization term of the denominator of a corresponding element in equation (2).

$$X_{ij}(\omega) = Sm_i(\omega) * Sm_j(\omega) \quad (3)$$

Storage 20

The storage 20 stores, in advance, a plurality of second correlation matrices calculated for the respective directions from the array arrangement of the microphone array 200.

In the present embodiment, the storage 20 may include a memory or the like, and, in the storage 20, reference correlation matrices $Rr(\theta, \omega)$ for respective probing directions θ are stored in advance as second correlation matrices. In the example illustrated in FIG. 4, in the storage 20, for example, as many reference correlation matrices $Rr(\theta_1, \omega)$ to $Rr(\theta_N, \omega)$ as N=180 in a range 0≤θ≤180 are stored in advance.

The reference correlation matrix $Rr(\theta, \omega)$ represents phase differences among microphone units for an acoustic wave coming from each direction θ, and thus the reference correlation matrix $Rr(\theta, \omega)$ can be theoretically calculated for a given sound source direction and a given array arrangement, that is, the arrangement of microphone units of the microphone array 200. A method of calculating the reference correlation matrix $Rr(\theta, \omega)$ is described below for a case in which the array arrangement of the microphone array 200 is as illustrated in FIG. 2.

In the example of the array arrangement illustrated in FIG. 2, as described above, microphone units 201 to 203 are disposed in a linear array in the microphone array 200. Furthermore, in this example illustrated in FIG. 2, the sound source S exists in the direction θs.

An acoustic wave originating from the sound source S arrives at the respective microphone units 201 to 203 such that an arrival time at the microphone unit 201 is earlier by time τ with respect to the arrival time at the center microphone unit 202, and an arrival time at the microphone unit 203 is later by time τ with respect to the arrival time at the center microphone unit 202. The time τ can be calculated according to equation (4) described below.

$$\tau = L \cdot \cos(\theta s)/c \quad (4)$$

where L denotes the distance between adjacent microphone units, and c denotes an acoustic velocity.

A directional vector indicating a phase difference relationship among the microphone units 201 to 203 for the acoustic wave coming from the direction θ can be represented using equation (5) with reference to the location of the center microphone unit 202.

$$d(\theta, \omega) = \left[ \exp\left(j\omega \frac{L \cdot \cos\theta}{c}\right) 1 \exp\left(-j\omega \frac{L \cdot \cos\theta}{c}\right) \right] \quad (5)$$

Therefore, the reference correlation matrix $Rr(\theta, \omega)$ for the sound source located in the direction of θ, that is, the reference correlation matrix $Rr(\theta, \omega)$ for the direction of θ can be calculated from equations (2), (3), and (5) as in equation (6) described below.

$$Rr(\theta, \omega) = d^H(\theta, \omega) d(\theta, \omega) = \begin{bmatrix} r_{11}(\theta, \omega) & r_{12}(\theta, \omega) & r_{13}(\theta, \omega) \\ r_{21}(\theta, \omega) & r_{22}(\theta, \omega) & r_{23}(\theta, \omega) \\ r_{31}(\theta, \omega) & r_{32}(\theta, \omega) & r_{33}(\theta, \omega) \end{bmatrix} \quad (6)$$

where $(\cdot)^H$ denotes complex conjugate transpose.

In the manner described above, the reference correlation matrices $Rr(\theta_1, \omega)$ to $Rr(\theta_N, \omega)$ are calculated for the respective directions $\theta_1$ to $\theta_N$ (for example N=180).

Selection Unit 30

The selection unit 30 selects one first element from elements of the first correlation matrix and also selects one second element from elements of each of the second correlation matrices such that each second element is at a matrix element position corresponding to a matrix element position of the first element, and sequentially changes the first element and the second elements by changing the matrix element position at which the first and second elements are selected, In this selection process, the selection unit 30 may limit element positions in the selection such that the first element and the second elements are selected only from either one of two groups of elements of respective correlation matrices including the first correlation matrix and the second correlation matrices, where the two groups of elements of each correlation matrix are defined such that the correlation matrix is divided into the two groups by a boundary defined by diagonal elements such that each group includes a plurality of elements but does not include the diagonal elements.

In the present embodiment, the selection unit 30 receives inputs of the observation correlation matrix $Rx(\omega)$ from the correlation matrix calculation unit 10 and the reference correlation matrix $Rr(\theta, \omega)$ from the storage 20, and the selection unit 30 selects an element, at a matrix element position, of the observation correlation matrix $Rx(\omega)$ and also sects an element, at a corresponding matrix element position, of each of the reference correlation matrices $Rr(\theta, \omega)$, and the selection unit 30 outputs the selected elements. The selection unit 30 includes, as illustrated, for example, in FIG. 4, a matrix element selection unit 31 and matrix element selection units 32-1 to 32-N. Although FIG. 4 illustrates only two matrix element selection units, that is, the matrix element selection unit 32-1 that receives an input of the reference correlation matrix $Rr(\theta_1, \omega)$ corresponding to the direction $\theta_1$ and the matrix element selection unit 32-N that receives an input of the reference correlation matrix $Rr(\theta_N, \omega)$ corresponding to the direction $\theta_N$, the selection unit 30 may include other matrix element selection units. In a case where the number of directions N=180, N matrix element selection units 32-1 to 32-N are provided to receive inputs of reference correlation matrices $Rr(\theta_1, \omega)$ to $Rr(\theta_N, \omega)$ corresponding to directions $\theta_1$ to $\theta_N$.

Next, an example of a selection method used by the selection unit 30 is described below with reference to FIG. 5.

Figure 5:
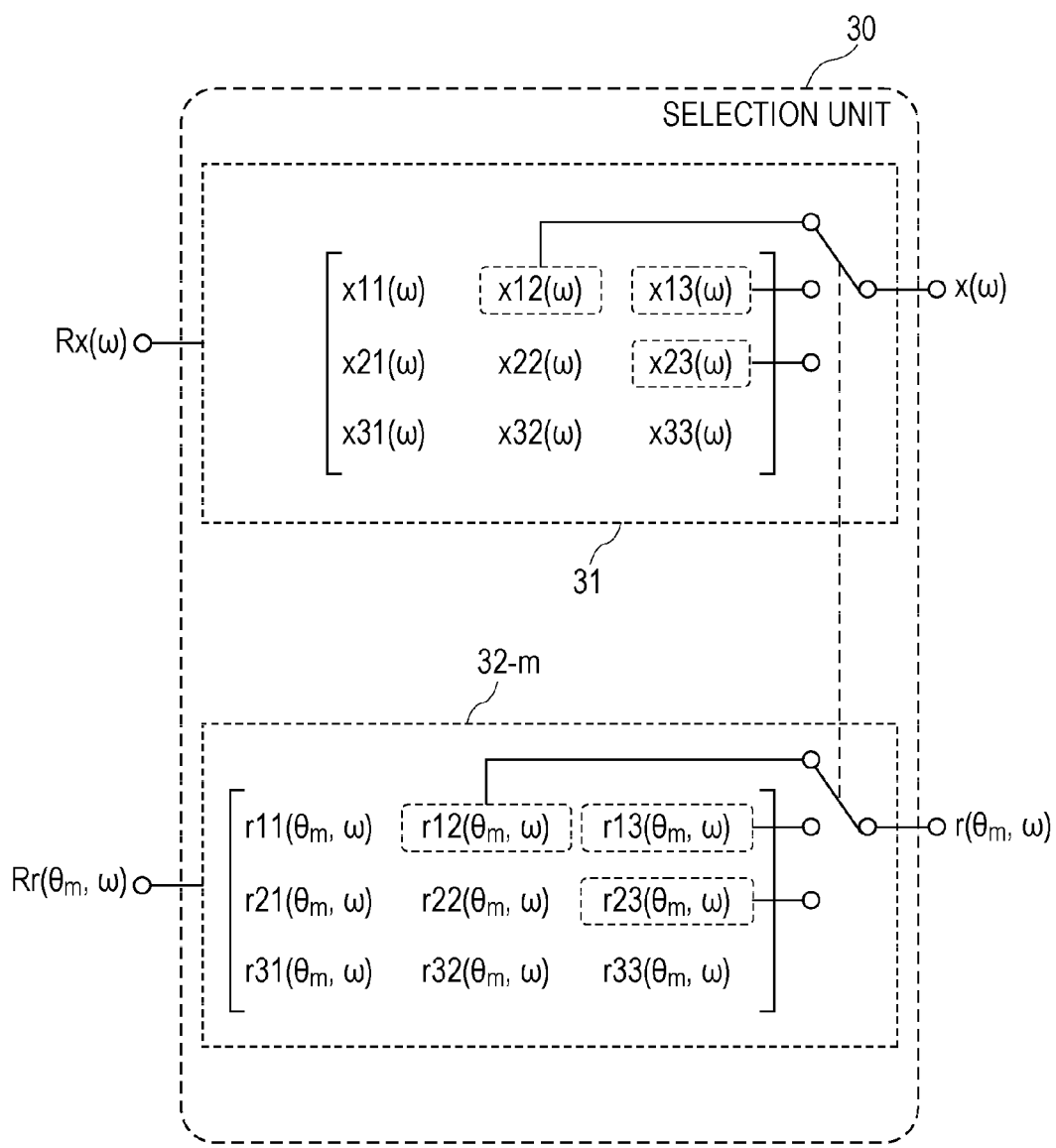
FIG. 5 is a schematic diagram illustrating a method of selection performed by a selection unit according to the first embodiment.

FIG. 5 is a schematic diagram illustrating a method of selection performed by the selection unit 30 according to the first embodiment.

As illustrated in FIG. 5, the matrix element selection unit 31 select one of elements (also referred to as matrix elements) of the observation correlation matrix $Rx(\omega)$ input from the correlation matrix calculation unit 10, and the matrix element selection unit 31 outputs the selected element as a phase difference signal $x(\omega)$. The matrix element selection unit 32-$m$ (m is an integer in a range from 1 (inclusive) to N (inclusive)) selects one of elements of the reference correlation matrix $Rr(\theta_m, \omega)$ input from the storage 20 such that the selected element is located in the same row and column as the row and column in which the element selected by the matrix element selection unit 31 is located, and the matrix element selection unit 32-$m$ outputs the selected element as a phase difference signal $r(\theta_m, \omega)$.

Note that in normal cases, diagonal elements of each correlation matrix each have a value of 1, and thus the diagonal elements do not make any contribution to signal processing. In each correlation matrix, elements $x_{ij}$ and $x_{ji}$, whose row and column are replaced by each other, are opposite in phase and identical to each other in terms of information. Taking into account these facts, the selection unit 30 may perform the selection such that each matrix of the reference correlation matrix $Rr(\theta, \omega)$ and the observation correlation matrix $Rx(\omega)$ is divided into two groups by a boundary defined by diagonal elements such that each group includes a plurality of elements but does not include the diagonal elements, and the element is selected only from the plurality of elements included in one of the two groups. That is, the selection unit 30 may select elements from an upper triangular matrix or a lower triangular matrix excluding diagonal elements of each of the reference correlation matrices $Rr(\theta, \omega)$ and the observation correlation matrix $Rx(\omega)$ and may output the selected elements. This makes it possible for the sound source probing apparatus 1 to reduce the amount of calculation.

Furthermore, to reduce the amount of calculation, the selection unit 30 may reduce the number of elements of the upper triangular matrix or the lower triangular matrix from which to select the element.

Learning Unit 40

The learning unit 40 performs learning on weights to determine the weights to be applied to the plurality of second correlation matrices stored in advance in the storage 20 such that the linear sum of the plurality of second correlation matrices multiplied by the respective weights is equal to the first correlation matrix. In this learning process, the learning unit 40 calculates the weights from the second correlation matrices and an error between the linear sum and the first correlation matrix by using an LMS algorithm or ICA (Independent Component Analysis). More specifically, the learning unit 40 determines, by learning, values of the weights that allow the linear sum of the products of second elements selected by the selection unit 30 and the respective values of the weights to be equal to the first element selected by the selection unit 30, and the learning unit 40 updates the values of the weights from first values to second values obtained as a result of the learning. Thereafter, the learning unit 40 further determines, by learning, third values of the weights that allow the linear sum of the products of second elements selected next by the selection unit 30 and the respective third values of the weights to be equal to the first element selected next by the selection unit 30, and the learning unit 40 updates the values of the weights from the second values to the third values obtained as a result of the learning. The learning unit 40 repeats the updating sequentially thereby calculating the weights by learning.

In the present embodiment, the learning unit 40 includes, as illustrated in FIG. 1 and FIG. 4, a holding unit 50, a linear sum calculation unit 60, an error calculation unit 70, a nonlinear function unit 80, and a weight updating unit 90. Note that the learning unit 40 does not necessarily need to include the nonlinear function unit 80, that is, the learning unit 40 may not include the nonlinear function unit 80.

Holding Unit 50

The holding unit 50 holds weights that are to be updated by the weight updating unit 90. The holding unit 50 holds weights to be multiplied by the respective reference correlation matrices $Rr(\theta, \omega)$. In other words, each of the weights is used in common for all elements of the reference correlation matrices $Rr(\theta_1, \omega)$ to $Rr(\theta_N, \omega)$.

Each weight is a function of variables of $\theta$ and $\omega$. By treating $\omega$ as a constant, it is possible to regard it as a one-dimensional coefficient. Thus, in the following discussion, the weights are denoted as weighting coefficients $a(\theta, \omega)$.

In the present embodiment, the weighting coefficients $a(\theta, \omega)$ are coefficients multiplied by the respective reference correlation matrices $Rr(\theta, \omega)$ defined in the various directions $\theta$. FIG. 4 illustrates an example in which weighting coefficients $a(\theta_1, \omega)$ to $a(\theta_N, \omega)$ corresponding to respective directions $\theta_1$ to $\theta_N$ (N=180) associated with reference correlation matrices $Rr(\theta, \omega)$ are illustrated for 180 directions in the range of $0 \leq \theta \leq 180$.

The holding unit 50 holds the weighting coefficients $a(\theta, \omega)$) updated by the weight updating unit 90. That is, the weighting coefficients $a(\theta, \omega)$ are learning coefficients whose value is updated based on the weight change amount calculated by the weight updating unit 90. The holding unit 50 outputs the held weighting coefficients $a(\theta, \omega)$ to the spatial spectrum calculation unit 100.

Linear Sum Calculation Unit 60

The linear sum calculation unit 60 calculates the linear sum of the plurality of second correlation matrices respectively weighted by weights held by the holding unit 50.

In the present embodiment, the linear sum calculation unit 60 includes, as illustrated in FIG. 4, signal multiplication units 61-1 to 61-N and a signal addition unit 62.

The signal multiplication unit 61-1 multiplies the element $r(\theta_1, \omega)$ of the reference correlation matrix $Rr(\theta_1, \omega)$ selected by the matrix element selection unit 32-1 by the weighting coefficient $a(\theta_1, \omega)$ in the direction $\theta_1$, and outputs a result to the signal addition unit 62. Similarly, the signal multiplication unit 61-N multiplies the element $r(\theta_N, \omega)$ of the reference correlation matrix $Rr(\theta_N, \omega)$ selected by the matrix element selection unit 32-N by the weighting coefficient $a(\theta_N, \omega)$ in the direction $\theta_N$, and outputs a result to the signal addition unit 62. As described above, the signal multiplication units 61-1 to 61-N multiply the reference correlation matrices $Rr(\theta, \omega)$ by the weighting coefficients $a(\theta, \omega)$ for the respective directions $\theta_1$ to $\theta_N$, and outputs resultant signals to the signal addition unit 62.

The signal addition unit 62 calculates the sum of the signals output from the respective signal multiplication units 61-1 to 61-N, and outputs the resultant sum as an estimated phase different signal $xr(\omega)$ to the error calculation unit 70. More specifically, the signal addition unit 62 determines the estimated phase different signal $xr(\omega)$ by calculating the linear sum of the signals output from the respective signal multiplication units 61-1 to 61-N according to equation (7).

$$xr(\omega) = \sum_{k=1}^{N} \{a(\theta_k, \omega) \cdot r(\theta_k, \omega)\} \quad (7)$$

Error Calculation Unit 70

The error calculation unit 70 calculates, as an error, the difference between the first correlation matrix and the linear sum calculated by the linear sum calculation unit 60. In the present embodiment, the error calculation unit 70 includes a signal subtraction unit 71 as illustrated in FIG. 4.

The signal subtraction unit 71 calculates an error signal $e(\omega)$ by subtracting the estimated phase different signal $xr(\omega)$ provided by the signal addition unit 62 from the phase difference signal $x(\omega)$ provided by the matrix element selection unit 31. More specifically, the signal subtraction unit 71 calculates the error signal $e(\omega)$ according to equation (8).

$$e(\omega) = x(\omega) - xr(\omega) \quad (8)$$

Nonlinear Function Unit 80

The nonlinear function unit 80 adds nonlinearity to the error using a particular nonlinear function. More specifically, the nonlinear function unit 80 converts the error signal $e(\omega)$ input from the signal subtraction unit 71 to a signal having added nonlinearity by applying a nonlinear function having a nonlinear input-output characteristic. The nonlinear function may be, for example, a hyperbolic tangent function. However, the nonlinear function is not limited to the hyperbolic tangent function, and an arbitrary nonlinear function may be used as long as it has a nonlinear input-output characteristic that imposes a limit on the signal amplitude. Even when the error signal $e(\omega)$ temporarily becomes large owing to a change in phase difference by an external disturbance, the nonlinearity makes it possible to suppress the influence on the weight change amount learned by the weight updating unit 90 described later.

Figure 6:
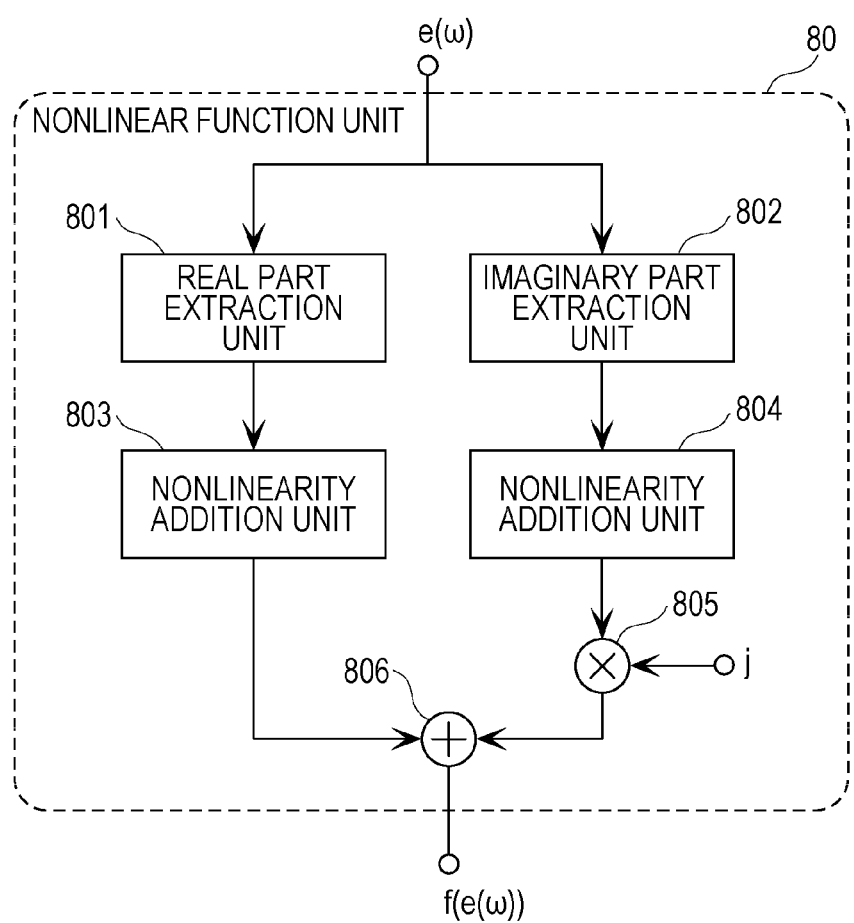
FIG. 6 is a diagram illustrating an example of a configuration of a nonlinear function unit according to a first embodiment.

FIG. 6 is a diagram illustrating an example of a configuration of the nonlinear function unit 80 according to the first embodiment. The nonlinear function unit 80 includes, as illustrated in FIG. 6, a real part extraction unit 801, an imaginary part extraction unit 802, a nonlinearity addition unit 803, a nonlinearity addition unit 804, an imaginary unit multiplication unit 805, and a signal addition unit 806.

The real part extraction unit 801 extracts a real part of the input error signal $e(\omega)$ and outputs the extracted real part to the nonlinearity addition unit 803. The imaginary part extraction unit 802 extracts an imaginary part of the input error signal $e(\omega)$ and outputs the extracted imaginary part to the nonlinearity addition unit 804.

The nonlinearity addition unit 803 adds nonlinearity to the signal amplitude of the real part of the error signal $e(\omega)$ input from the real part extraction unit 801 by applying the nonlinear function, and outputs a result to the signal addition unit 806. The nonlinearity addition unit 804 adds nonlinearity to the signal amplitude of the imaginary part of the error signal $e(\omega)$ input from the imaginary part extraction unit 802 by applying the nonlinear function, and outputs a result to the imaginary unit multiplication unit 805.

To convert the signals input from the nonlinearity addition unit 804 back to the imaginary form, the imaginary unit multiplication unit 805 multiplies the signal by the imaginary unit $j$ and outputs a result to the signal addition unit 806. The signal addition unit 806 adds the real-part signal input from the nonlinearity addition unit 803 and the imaginary-part signal input from the imaginary unit multiplication unit 805, and outputs a result as a complex signal $f(e(\omega))$ added with nonlinearity to the weight updating unit 90.

Equation (9) shows an example of a complex signal $f(e(\omega))$ added with nonlinearity. In equation (9), hyperbolic tangent $\tanh(\cdot)$ is used by way of example as the nonlinear function where $\mathrm{real}(\cdot)$ denotes the real part, $\mathrm{imag}(\cdot)$ denotes the imaginary part, and $j$ denotes the imaginary unit.

$$f(e(\omega)) = \tan h(\mathrm{real}(e(\omega))) j \cdot \tan h(\mathrm{image}(e(\omega))) \quad (9)$$

Weight Updating Unit 90

The weight updating unit 90 calculates weight change amounts from the error and the second correlation matrices using an LMS (Least Mean Square) algorithm or ICA (Independent Component Analysis), and updating the weights held in the holding unit 50 by adding the calculated weight change amounts to the weights held in the holding unit 50. In a case where the sound source probing apparatus 1 includes the nonlinear function unit 80, the weight updating unit 90 calculates the weight change amounts from the error modified nonlinearly by the nonlinear function unit 80 and the second correlation matrices, and updating the weights held in the holding unit 50 by adding the resultant weight change amounts to the weights held in the holding unit 50.

In the present embodiment, the weight updating unit 90 receives inputs of the complex signal $f(e(\omega))$ from the nonlinear function unit 80 and the N phase difference signals $r(\theta_1, \omega)$ to $r(\theta_N, \omega)$ from the selection unit 30. The weight updating unit 90 then calculates the weight change amounts $\Delta a(\theta_1, \omega)$ to $\Delta a(\theta_N, \omega))$ to be applied to the weighting coefficients $a(\theta_1, \omega)$ to $a(\theta_N, \omega)$ that are multiplied by the N phase difference signals $r(\theta_1, \omega)$ to $r(\theta_N, \omega)$.

For example, in a case where the sound source probing apparatus 1 does not include the nonlinear function unit 80, the weight updating unit 90 calculates the weight change amounts $\Delta a(\theta_1, \omega)$ to $\Delta a(\theta_N, \omega)$ using equation (10). On the other hand, in the case where the sound source probing apparatus 1 includes the nonlinear function unit 80, the weight updating unit 90 calculates the weight change amounts $\Delta a(\theta_1, \omega)$ to $\Delta a(\theta_N, \omega)$ using equation (11).

$$\Delta a(\theta_k, \omega) = \mathrm{real}(\beta \cdot e(\omega) \cdot r(\theta_k, \omega)^*) \quad (10)$$

$$\Delta a(\theta_k, \omega) = \mathrm{real}(\beta \cdot f(e(\omega)) \cdot r(\theta_k, \omega)^*) \quad (11)$$

Note that in equations (10) and (11), the weight change amounts are updated using the LMS algorithm. $\beta$ is a parameter for controlling the updating rate. In the correlation matrices, the elements $r_{ij}(\omega)$ and $r_{ji}(\omega)$ are opposite in phase to each other. Therefore, equations (10) and (11) each include $\mathrm{real}(\cdot)$ because the imaginary parts are cancelled out.

The weight updating unit 90 then updates the coefficients $a(\theta_k, \omega)$ stored in the holding unit 50 by using the calculated weight change amounts according to equation (12) described below.

$$a(\theta_k, \omega) = a(\theta_k, \omega) + \Delta a(\theta_k, \omega) \quad (12)$$

Spatial Spectrum Calculation Unit 100

The spatial spectrum calculation unit 100 calculates a spatial spectrum of an observation signal using the weights calculated by the learning unit 40 such that the spatial spectrum indicates sound pressure intensities in the respective directions.

In the present embodiment, the spatial spectrum calculation unit 100 receives inputs of the weighting coefficients $a(\theta_1, \omega)$ to $a(\theta_N, \omega)$ updated via learning by the weight updating unit 90 and held in the holding unit 50, and the spatial spectrum calculation unit 100 calculates the spatial spectrum $p(\theta)$ and outputs the resultant spatial spectrum $p(\theta)$ to the output unit 110.

More specifically, the spatial spectrum calculation unit 100 obtains the spatial spectrum p(θ) by calculating the sum or the average, with respect to the frequency ω, of the weighting coefficients a(θ, ω) held in the holding unit 50 according to equation (13) described below. This can give the spatial spectrum p(θ), as described later, because the weighting coefficients a(θ, ω) indicate the intensities of acoustic waves as function of the direction θ and the frequency ω.

$$p(\theta) = \sum_{\omega} a(\theta, \omega) \qquad (13)$$

Operation of Sound Source Probing Apparatus 1

A sound source probing process performed by the sound source probing apparatus 1 configured in the above-described manner is described below.

Figure 7:
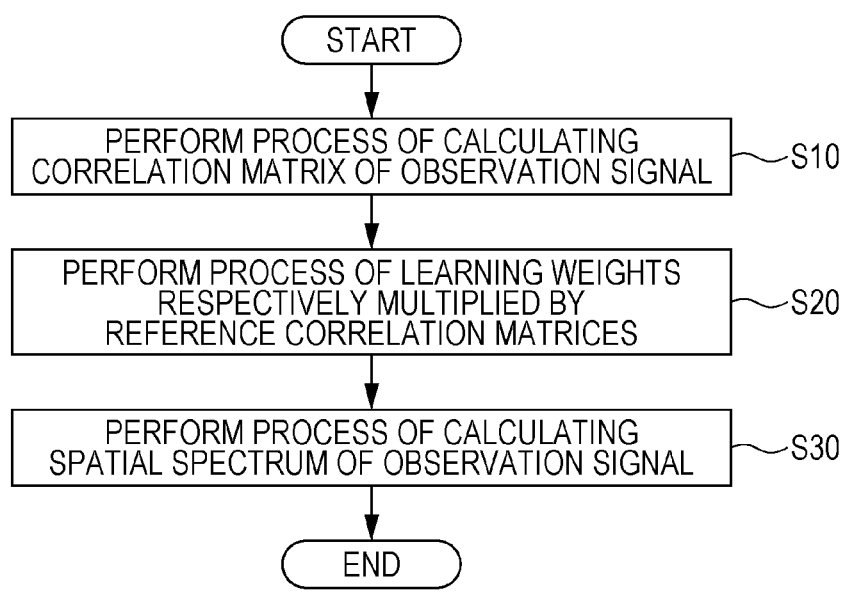
FIG. 7 is a flow chart illustrating a sound source probing process by a sound source probing apparatus according to the first embodiment.

FIG. 7 is a flow chart illustrating the sound source probing process by the sound source probing apparatus 1 according to the first embodiment.

First, the sound source probing apparatus 1 performs a process of calculating a correlation matrix of an observation signal (S10). More specifically, the sound source probing apparatus 1 calculates an observation correlation matrix Rx(ω) which is a correlation matrix of acoustic signals detected as observation signals by the microphone array 200 including two or more microphone units disposed apart from each other.

Next, the sound source probing apparatus 1 performs a learning process on weights multiplied by respective reference correlation matrices (S20). More specifically, the sound source probing apparatus 1 calculating, by learning, weights such that the linear sum of a plurality of reference correlation matrices Rr(θ, ω) respectively multiplied by weighting coefficients a(θ, ω) is equal to the observation correlation matrix Rx(ω) where the reference correlation matrices Rr(θ, ω) are correlation matrices calculated from the array arrangement of the microphone array for respective directions and are stored in advance in the storage 20.

Next, the sound source probing apparatus 1 performs a process of calculating a spatial spectrum of the observation signal (S30). More specifically, the sound source probing apparatus 1 calculates the spatial spectrum of the observation signal using the weights calculated in step S10 such that the spatial spectrum indicates the sound pressure intensity as a function of the direction.

Figure 8:
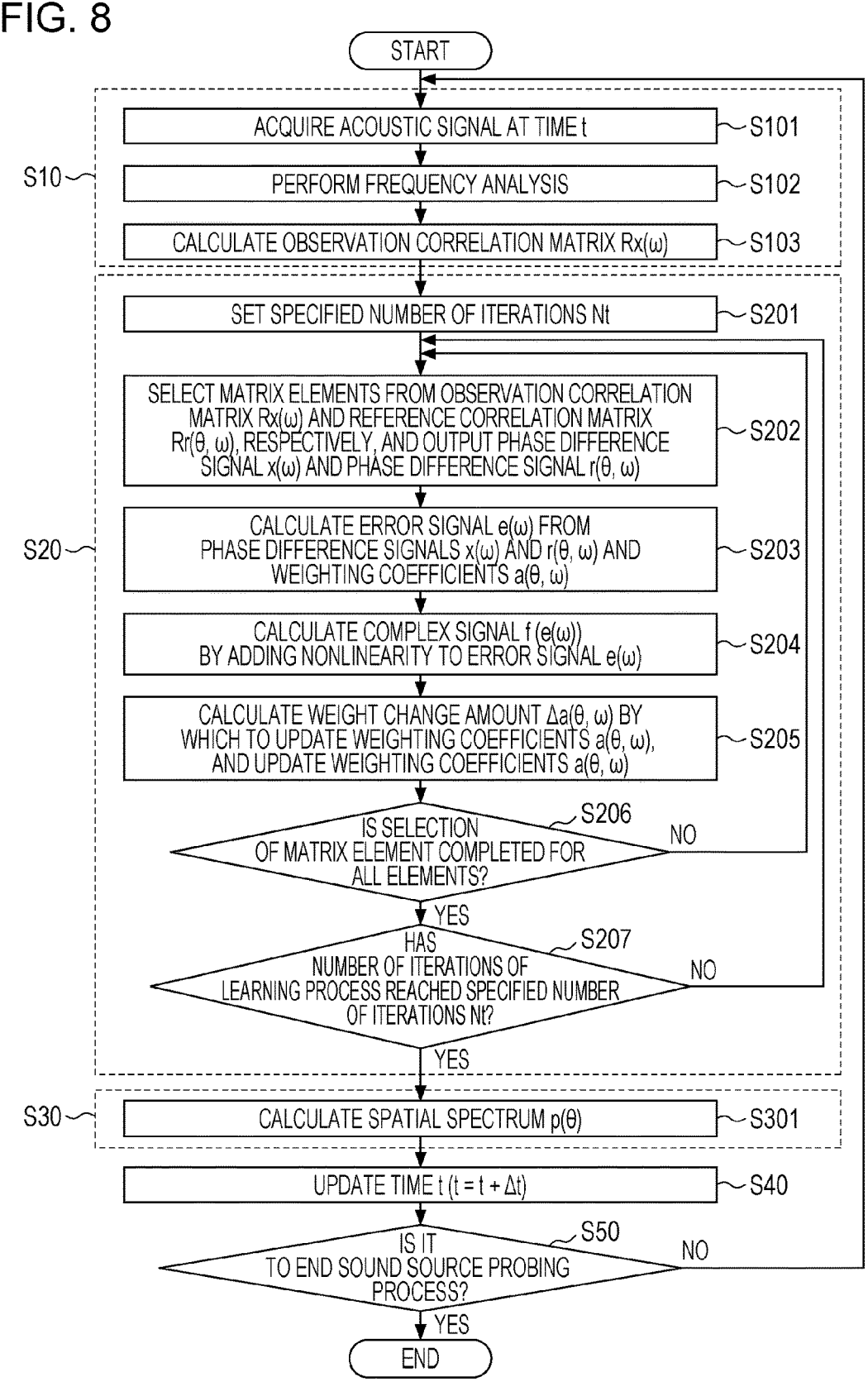
FIG. 8 is a flow chart illustrating details of the sound source probing process illustrated in FIG. 7.

FIG. 8 is a flow chart illustrating details of the sound source probing process illustrated in FIG. 7. In FIG. 8, elements similar to those in FIG. 7 are denoted by similar symbols.

That is, first, in step S10, the microphone array 200 acquires an acoustic signal at time t (S101). Next, the frequency analysis unit 300 perform frequency analysis on the acoustic signal acquired in step S101 (S102), and the frequency analysis unit 300 converts the acoustic signal to a frequency spectrum signal which is a frequency-domain signal. The sound source probing apparatus 1 then calculates an observation correlation matrix Rx(ω), which is a correlation matrix of the observation signal at time t, from the frequency spectrum signal obtained via the conversion in step S102 (S103).

Next, in step S20, the specification number of iterations Nt specifying the number of times the learning process of the weights is to be performed is set in the sound source probing apparatus 1 (S201). The sound source probing apparatus 1 then selects an element, at a matrix element position, of the observation correlation matrix Rx(ω) and also selects an element, at a corresponding matrix element position, of each of the reference correlation matrices Rr(θ, ω), and the sound source probing apparatus 1 outputs a phase difference signal x(ω) and phase difference signals r(θ, ω) (S202). Next, the sound source probing apparatus 1 calculates an error signal e(ω) from the phase difference signal x(ω), the phase difference signals r(θ, ω), and the weighting coefficient a(θ, ω) (S203). Next, the sound source probing apparatus 1 calculates a complex signal f(e(ω)) by adding nonlinearity to the error signal e(ω) (S204). Next, the sound source probing apparatus 1 calculates weight change amounts Δa(θ, ω) of the weighting coefficients a(θ, ω) from the complex signal f(e(ω)) calculated in step S204 and the phase difference signals r(θ, ω) calculated in step S203, and updates the weighting coefficients a(θ, ω) according to the calculated weight change amounts Δa(θ, ω) (S205). The sound source probing apparatus 1 then determines whether the selection in S202 is completed for all matrix elements of the observation correlation matrix Rx(ω) and the reference correlation matrices Rr(θ, ω) (S206). In a case where the selection is completed for all matrix elements (YES in S206), the sound source probing apparatus 1 determines whether the number of iterations of the learning process on the weighting coefficients a(θ, ω) has reached the specified number of iterations Nt (S207). In a case where the specified number of iterations Nt has been reached (YES in S207), the sound source probing apparatus 1 proceeds to next step S30. In a case where it is determined in step S206 that the selection is not completed for all matrix elements (NO in S206) or in a case where it is determined in step S207 that the specified number of iterations Nt has not yet been reached (NO in S207), the processing flow returns to step S202.

Next, in step S30, the sound source probing apparatus 1 calculates the spatial spectrum p(θ) of the observation signal from the weighting coefficients a(θ, ω) updated via the learning in step S20 (S301).

Next, in step S40, the sound source probing apparatus 1 updates the time t to new time t+Δt, and then in step S50 the sound source probing apparatus 1 determines whether the sound source probing process is to be ended. In a case where it is determined that the sound source probing process is not to be ended (NO in S50), the processing flow returns to step S10, and the correlation matrix of the observation signal at time t+Δt is calculated as the observation correlation matrix Rx(ω).

As described above, the sound source probing apparatus 1 repeats the learning on the weighting coefficients for each of all matrix elements until the linear sum of the reference correlation matrices Rr(θ, ω) respectively multiplied by the weighting coefficients a(θ, ω) is equal to the observation correlation matrix Rx(ω). The sound source probing apparatus 1 may repeat the learning as many times as specified by the value Nt. For example, in a case where the reference correlation matrices Rr(θ, ω) and the observation correlation matrices Rx(ω) are each a 3×3 matrix and the specified number of times Nt is 3, the learning process is performed three times for each of three elements of an upper triangular matrix or a lower triangular matrix, and thus the learning process is performed nine times in total. By performing the learning process in the above-described manner, it is possible to determine the values of the weighting coefficients a(θ, ω) such that the linear sum of the reference correlation matrices Rr(θ, ω) respectively multiplied by the weighting coefficients a(θ, ω) becomes closer to the observation correlation matrix Rx(ω).

Principle of Operation

Next, a principle is described below as to the learning on the weighting coefficients such that the linear sum of the reference correlation matrices $Rr(\theta, \omega)$ respectively multiplied by the weighting coefficients $a(\theta, \omega)$ is equal to the observation correlation matrix $Rx(\omega)$. A principle is described also as to the calculation of the spatial spectrum $p(\theta)$ using the obtained weighting coefficients $a(\theta, \omega)$.

It is known that the observation correlation matrix $Rx(\omega)$ determined based on the signals from the microphone array 200, that is, the observation correlation matrix $Rx(\omega)$ output from the correlation matrix calculation unit 10 can be approximated by a linear sum of correlation matrices $Rs(\theta, \omega)$, associated with a spatial sound source existing in a direction $\theta$, multiplied by intensities $u(\theta, \omega)$. $Rs(\theta, \omega)$ has direction information, that is, information indicating the phase difference between the acoustic waves detected by the microphone units depending on the sound arrival direction. The intensity $u(\theta, \omega)$ indicates strength of an acoustic wave. By determining the intensity $u(\theta, \omega)$ of the acoustic wave for each direction $\theta$, it is possible to determine the spatial spectrum $p(\theta)$.

$$Rx(\omega) \stackrel{*}{=} \sum_\theta \{u(\theta, \omega) \cdot Rs(\theta, \omega)\} \tag{14}$$

In equation (14), the observation correlation matrix $Rx(\omega)$ is an observable correlation matrix and is a known variable. On the other hand, the intensities $u(\theta, \omega)$ and the correlation matrices $Rs(\theta, \omega)$ are unknown variables. The correlation matrices $Rs(\theta, \omega)$ are correlation matrices associated with the respective directions $\theta$. Each matrix element of a correlation matrix associated with a particular direction $\theta$ indicates a phase difference among microphone units in a state in which an acoustic wave comes from the direction $\theta$. Thus, the correlation matrix $Rs(\theta, \omega)$ can be rewritten by theoretical values for the particular known microphone unit arrangement of the microphone array as a function of the direction $\theta$ and the acoustic velocity c. Note that equations (4), (5), and (6) indicate the reference correlation matrices $Rr(\theta, \omega)$ representing theoretical values obtained by rewriting the correlation matrices $Rs(\theta, \omega)$ using known information.

When the unknown variables, that is, the intensities $u(\theta, \omega)$ of the spatial spectrum to be determined by the sound source probing apparatus 1 are given by the weighting coefficients $a(\theta, \omega)$, equation (14) can be rewritten as equation (15).

$$Rx(\omega) = \sum_\theta \{a(\theta, \omega) \cdot Rr(\theta, \omega)\} \tag{15}$$

In equation (15), the observation correlation matrix $Rx(\omega)$ represents observed values and the reference correlation matrices $Rr(\theta, \omega)$ represent known theoretical values. Therefore, to calculate equation (15) is a problem of determining the weighting coefficients $a(\theta, \omega)$. This type of problem is also called a semi-blind problem.

This problem is different from other usual methods of identifying acoustic signals in that the observation correlation matrix $Rx(\omega)$ and the reference correlation matrices $Rr(\theta, \omega)$ are matrices, the weighting coefficients $a(\theta, \omega)$ are one-dimensional coefficients, and signals corresponding to the observation signal and the reference signals are given by complex numbers in the form of rotors that represent phase differences whose amplitude is always equal to 1.

Since the observation correlation matrix $Rx(\omega)$ and the reference correlation matrices $Rr(\theta, \omega)$ are matrices and the weighting coefficients $a(\theta, \omega)$ are one-dimensional coefficients, the weighting coefficients $a(\theta, \omega)$ to be determined here values of the weighting coefficients $a(\theta, \omega)$ that are correct solutions for any combinations of corresponding matrix elements of the observation correlation matrix $Rx(\omega)$ and the reference correlation matrices $Rr(\theta, \omega)$. That is, the problem given here is to determine the weighting coefficients $a(\theta, \omega)$ in equation (16) which is obtained by rewriting equation (15) to an expression using matrix elements. In equation (16), $x_{ij}(\omega)$ denotes a matrix element of the observation correlation matrix $Rx(\omega)$, and $r_{ij}(\theta, \omega)$ denotes a matrix element of the reference correlation matrix $Rr(\theta, \omega)$.

$$x_{ij}(\omega) = \sum_\theta \{a(\theta, \omega) \cdot r_{ij}(\theta, \omega)\} \tag{16}$$

In the present embodiment, equation (16) is rewritten to equation (17), and values of $a(\theta, \omega)$ that minimize the error signal $e(\omega)$, which is an estimated error, are determined via learning using LMS or ICA (Independent Component Analysis). Note that the learning method is not limited to these examples.

$$e(\omega) = x_{ij}(\omega) - \sum_\theta \{a(\theta, \omega) \cdot r_{ij}(\theta, \omega)\} \tag{17}$$

More specifically, to determine weighting coefficients $a(\theta, \omega)$ that satisfy equation (17) for an arbitrary matrix element position of the $x_{ij}(\omega)$ and $r_{ij}(\theta, \omega)$, the selection unit 30 repeatedly selects matrix elements from one matrix element position to another, and the learning of the weighting coefficients is performed for each matrix element position. The signal multiplication units 61-1, ..., 61-N perform the multiplication operations in the second term on the right-hand side of equation (17). The signal addition unit 62 performs the addition operation (denoted by $\Sigma$) in equation (17). The signal subtraction unit 71 performs the subtraction operation in equation (17).

Since the signals corresponding to the observation signal and the reference signals are given by complex numbers in the form of rotors representing phase differences whose amplitude is always equal to 1, nonlinearity is added to the error signal $e(\omega)$ such that mutual influences among directions are suppressed by means of independent component analysis (ICA).

In the present embodiment, as illustrated in FIG. 6, the error signal $e(\omega)$ is divided into a real part and an imaginary part, and a nonlinear function such as that described in equation (9) is applied to each of the real part and the imaginary part. In this way, differences depending on the sound direction $\theta$ are learned as independent components, and thus it becomes possible to achieve a convergence without being interfered significantly with other directions.

In view of the above, the weighting coefficients are updated according to equations (10) and (11). After obtaining the weighting coefficients $a(\theta, \omega)$ learned in the above-described manner, it is possible to calculate the spatial spectrum $p(\theta)$ to be output from the sound source probing apparatus 1 according to equation (13) using the learned weighting coefficients a(θ, ω).

Effects

As described above, according to the present embodiment, the sound source probing apparatus 1 is capable of determining the spatial spectrum p(θ) based on the observation correlation matrix Rx(ω) of the acoustic signals detected via the plurality of microphone units of the microphone array 200. More specifically, the reference correlation matrices Rr(θ, ω) associated with respective directions are prepared in advance by performing the theoretical calculation based on the array arrangement of the microphone array 200, and the weighting coefficients a(θ, ω) are calculated via learning such that the reference correlation matrices Rr(θ, ω) associated with the respective directions are multiplied by the corresponding weighting coefficient a(θ, ω), and the sum of these products becomes equal to the observation correlation matrix Rx(ω). Thereafter, using the obtained weighting coefficients a(θ, ω), the spatial spectrum p(θ) is calculated. This allows it to estimate intensities in directions in which a disturbing sound source and a sound source to be probed exist by iteratively calculating weighting coefficients a(θ, ω) instead of performing a large amount of calculation to determine the spatial spectrum from the correlation matrices and directional vectors, and thus it is possible to determine, in as small intervals as frequency analysis frames of several milliseconds to several seconds, the spatial spectrum p(θ) based on the observation correlation matrix Rx(ω of the acoustic signal detected via the microphone units. That is, the sound source probing apparatus 1 according to the present embodiment provides an excellent performance in terms of quick response to a change in sound.

Furthermore, the sound source probing apparatus 1 according to the present embodiment is capable of calculating the intensities in respective directions while cancelling out influences by other directions. For example, let it be assumed that an angle range from $\theta_1$ to $\theta_m$ is a probing angle range and a disturbing sound exists in an angle range from $\theta_{m+1}$ to $\theta_N$ and thus this range is a non-probing range. Equation (15) can be rewritten such that a term associated with the probing range to be detected is put on the left-hand side and a term associated with the non-probing range in which a disturbing sound exists is put on the right-hand side as shown in equation (18).

$$\sum_{\theta=1}^{m} \{a(\theta, \omega) \cdot Rr(\theta, \omega)\} = Rx(\omega) - \sum_{\theta=m+1}^{N} \{a(\theta, \omega) \cdot Rr(\theta, \omega)\} \quad (18)$$

In equation (18) rewritten in the above-described manner, the term on the left-hand side is a correlation matrix corresponding to a spatial spectrum obtained as a result of sound source probing. The first term on the right-hand side of equation (18) is an observation correlation matrix associated with a mixture of sounds observed in all directions, and the second term on the right-hand side of equation (18) is a correlation matrix associated with a disturbing sound component. It can be seen that in the right-hand side of equation (18), the correlation matrix of the disturbing sound component is subtracted from the observation correlation matrix Rx(ω), that is, the disturbing sound component is eliminated. This elimination occurs in each direction θ, and thus an increase in noise immunity performance is achieved. Furthermore, since the weighting coefficients a(θ, ω) are determined simultaneously for all directions, it is also possible to achieve a quick response to a change in sound.

Thus, in the sound source probing apparatus 1 according to the present embodiment, by calculating the spatial spectrum p(θ) from the weighting coefficients a(θ, ω) in the probing range, it is possible to achieve the high noise immunity performance, the high performance in terms of the quick response to a change in sound, and the high sound source probing performance.

As described above, in the sound source probing apparatus 1 according to the present embodiment, it is assured that it is possible of detecting a sound source in the probing range. Furthermore, according to the present embodiment, the sound source probing apparatus 1, the calculation of the spatial spectrum p(θ) using the weighting coefficients a(θ, ω) makes it possible to achieve the high noise immunity performance and the high performance in terms of the quick response to a change in sound.

Figure 9:
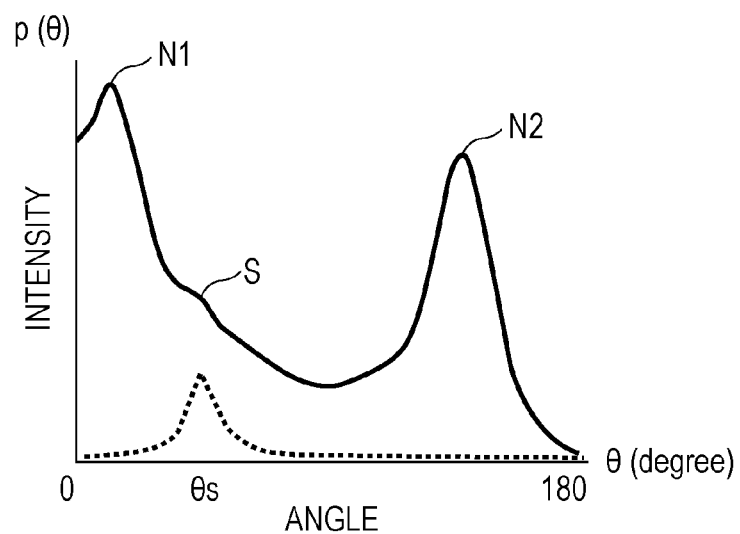
FIG. 9 is a spatial spectrum diagram in a comparative example.
Figure 10:
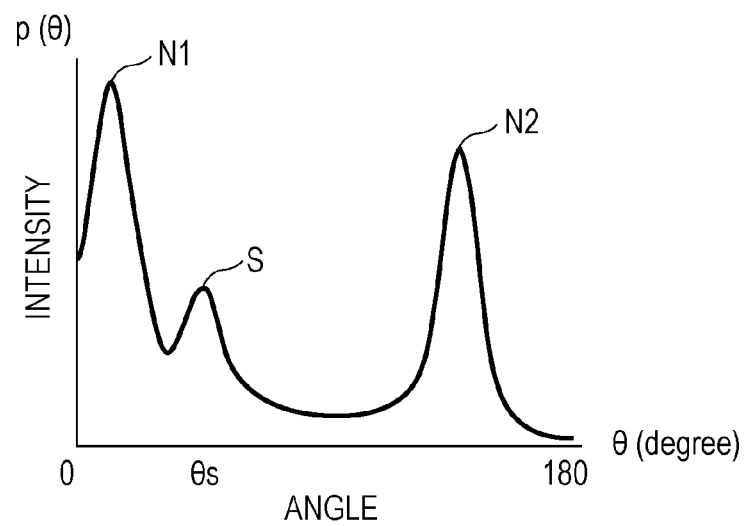
FIG. 10 is a spatial spectrum diagram according to the first embodiment.

Referring to FIG. 9 and FIG. 10, effects of the sound source probing apparatus 1 according to the present embodiment are described below.

FIG. 9 is a spatial spectrum diagram in a comparative example in which the spatial spectrum is calculated using the technique disclosed in Japanese Unexamined Patent Application Publication No. 2014-56181 for a case where a sound source N1 and a sound source N2 that may disturb a sound source S exist close to the sound source S.

In the spatial spectrum shown in FIG. 9, the intensity of the sound source N1 functioning as a disturbing sound appears not only in a direction in which the sound source N1 exists but also appears over a wide range such that the intensity decreases as the direction (the angle) goes away from the direction of the sound source N1. The intensity of the sound source N2 functioning as a disturbing sound also appears in a similar manner to the sound source N1. As a result, as illustrated in FIG. 9, in a case where the sound pressure levels of the sound source N1 and sound source N2 are higher than the sound pressure level of the sound source S, the peak of the intensity of the sound source S is hidden below the two peaks of the intensity of the sound source N1 and the sound source N2 functioning as disturbing sounds. Thus, the technique of this comparative example is not capable of detecting the peak of the intensity of the sound source S and thus this technique is not capable of detecting the existence of the sound source S. That is, the technique of this comparative example is not capable of probing the direction of the sound source S.

FIG. 10 illustrates a spatial spectrum obtained according to the first embodiment in which the spatial spectrum is calculated by the sound source probing apparatus 1 according to the first embodiment also for the case where the sound source N1 and the sound source N2 that may disturb the sound source S exist close to the sound source S. Since the sound source probing apparatus 1 calculates the spatial spectrum p(θ) using the weighting coefficients a(θ, ω), the interference among directions can be cancelled out. As a result, as shown in FIG. 10, regardless of whether the sound pressure levels of the sound source N1 and the sound source N2 are higher or lower than the sound pressure level of the sound source S, peaks appear separately among the peak of the intensity of the sound source S and the two peaks of the intensity of the sound source N1 and the sound source N2 functioning as disturbing sounds. That is, it is possible to simultaneously probing distinctively the peaks of the intensity of the sound source S and the two peaks of the intensity of the sound source N1 and the sound source N2 functioning as disturbing sounds.

Thus, in the sound source probing apparatus 1 according to the present embodiment, it is assured that it is possible of detecting a sound source in the probing range.

Note that in the observation correlation matrix $Rx(\omega)$ calculated by the correlation matrix calculation unit 10 and the reference correlation matrices $Rr(\theta, \omega)$ in the respective probing directions $\theta$ stored in the storage 20, elements in the upper triangular matrix or arbitrary selected elements of the correlation matrix used in the calculation may be represented in the form of vectors. In this case, the selection unit 30 may sequentially select elements of the vectors and may output the selected elements.

In the embodiments described above, it is assumed by way of example that the number of directions, N, is 180 for the reference correlation matrices $Rr(\theta, \omega)$ and the weighting coefficients $a(\theta, \omega)$. However, the number of directions is not limited to 180. Depending on the purpose of the sound source probing apparatus 1 and/or the number of microphone units of the microphone array or the calculation amount, the number of directions N may be increased or reduced with no specific limit. The angle intervals may be set to be constant or not constant. In the above description of the present embodiment, no particular limit is imposed on the range of the frequency $\omega$ for the observation correlation matrix $Rx(\omega)$, the reference correlation matrices $Rr(\theta, \omega)$, and the weighting coefficients $a(\theta, \omega)$. However, the range of the frequency $\omega$ may be limited depending on the frequency components included in the sound source.

Second Embodiment

In the first embodiment described above, by way of example, the spatial spectrum $p(\theta)$ is calculated using the weighting coefficients $a(\theta, \omega)$ subjected to the learning. For example, an acoustic signal waveform coming from a specified direction may be calculated using the weighting coefficients $a(\theta, \omega)$ subjected to the learning. This case is described below as a second embodiment.

Figure 11:
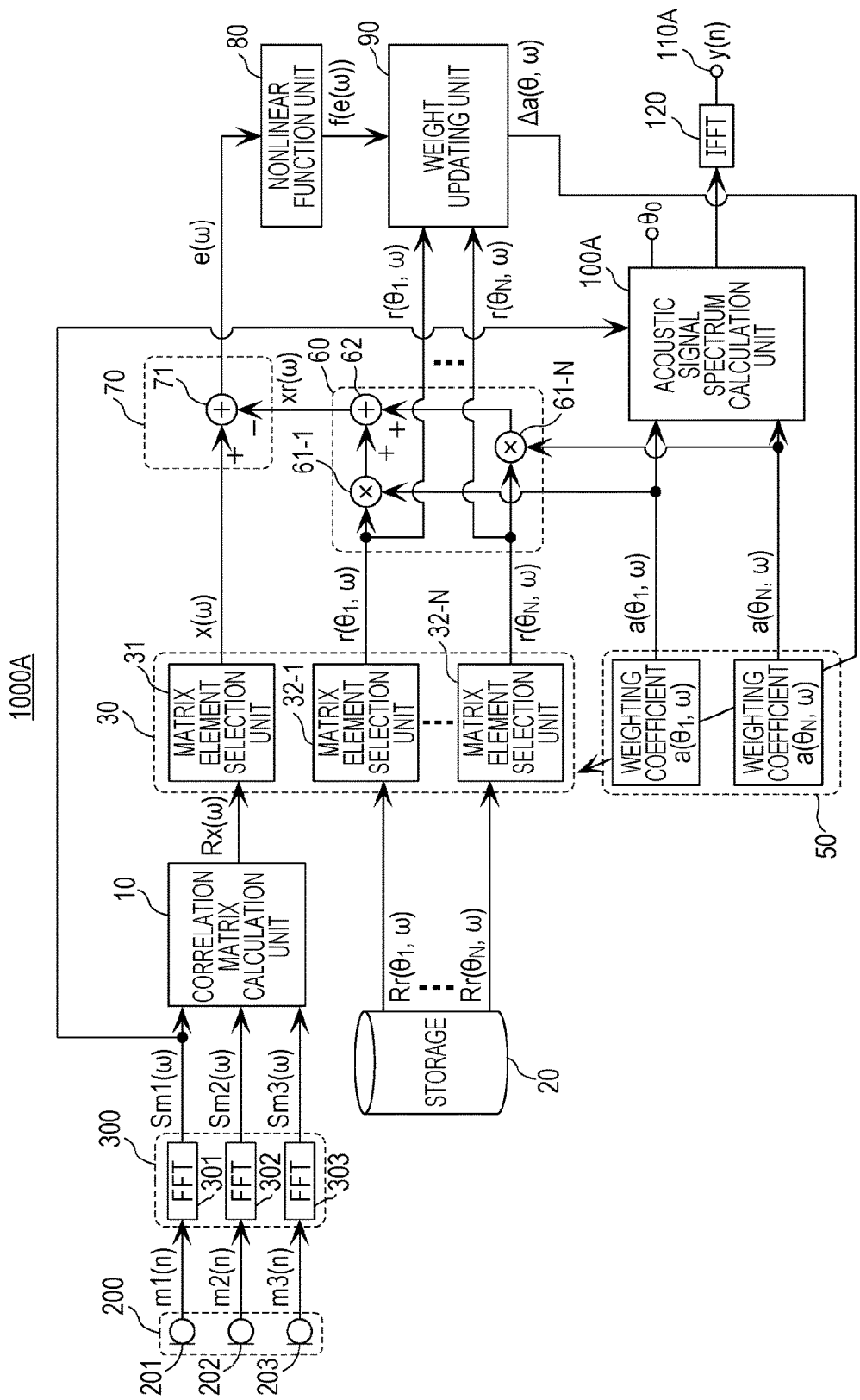
FIG. 11 is a diagram illustrating an example of a configuration of a sound source probing system according to a second embodiment.

FIG. 11 is a diagram illustrating an example of a configuration of a sound source probing system 1000A according to the second embodiment. The sound source probing system 1000A is a microphone apparatus using a sound source probing apparatus. In FIG. 11, elements similar to those in FIG. 1 or FIG. 4 are denoted by similar symbols, and a further description thereof is omitted.

The sound source probing system 1000A illustrated in FIG. 11 is different from the sound source probing system 1000 according to the first embodiment in the configurations of an acoustic signal spectrum calculation unit 100A, an output unit 110A, and an IFFT 120.

Acoustic Signal Spectrum Calculation Unit 100A

The acoustic signal spectrum calculation unit 100A receives inputs of weighting coefficients $a(\theta, \omega)$ held in a holding unit 50, a frequency spectrum signal $Sm1(\omega)$ of an acoustic signal $m1(n)$ supplied from a microphone unit 201, and a direction $\theta_0$ specifying a direction in which a signal is to be acquired, and the acoustic signal spectrum calculation unit 100A calculates an acoustic signal spectrum $Y(\omega)$ to be output.

More specifically, the acoustic signal spectrum calculation unit 100A calculates the acoustic signal spectrum $Y(\omega)$ according to equation (19).

$$Y(\omega) = a(\theta_0, \omega) Sm1(\omega) \qquad (19)$$

From the point of view of the angle resolution in the sound source probing, depending on the size of the microphone array 200 or the number of microphone units, weighting coefficients in a small angle range around the specified direction $\theta_0$ may be added together as described in equation (20).

$$Y(\omega) = \left\{ \sum_{\theta=\theta_0-\Delta}^{\theta_0+\Delta} a(\theta, \omega) \right\} Sm1(\theta) \qquad (20)$$

The weighting coefficients $a(\theta, \omega)$ in equation (19) and equation (20) represent the intensities of acoustic waves in the respective directions $\theta$ as described above in the section of "Principle of operation", and thus the weighting coefficient $a(\theta, \omega)$ in a particular direction $\theta$ represents the ratio of the intensity of the spectrum in this direction $\theta$ to the total spectrum over the all directions. Therefore, by multiplying the weighting coefficients $a(\theta, \omega)$ by the frequency spectrum $Sm1(\omega)$ in the respective directions, it is possible to calculate the acoustic signal spectrum $Y(\omega)$ for the acoustic wave coming from the specified direction $\theta_0$.

IFFT 120 the IFFT (Inverse Fast Fourier Transform) 120 determines an acoustic signal waveform $y(n)$ obtained by performing an inverse fast Fourier transform on the acoustic signal spectrum $Y(\omega)$ calculated by the acoustic signal spectrum calculation unit 100A, and the IFFT 120 output the resultant acoustic signal waveform $y(n)$ to the output unit 110A.

Effects

According to the present embodiment, as described above, the sound source probing system 1000A is capable of calculating an acoustic signal waveform $y(n)$ associated with only a specified particular direction using the coefficients $a(\theta, \omega)$ calculated via the learning by the sound source probing apparatus having a high noise immunity performance, and outputting the resultant acoustic signal waveform $y(n)$. Thus it is possible to achieve a function of a microphone apparatus capable of extracting only a sound coming in a particular direction.

The sound source probing apparatus or the like according to one or a plurality of aspects of the present disclosure has been described above with reference to embodiments and modifications. However, the present disclosure is not limited to those embodiments or modifications described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure. Some examples of such modifications, which also fall within the scope of the present disclosure, are described below.

(1) The sound source probing apparatus or the like described above may be a computer system including a microprocessor, a ROM, a RAM, a had dis unit, a display unit, a keyboard, a mouse, etc. In the RAM or the had dis unit, a computer program is stored. The microprocessor operates according to the computer program so as to achieve functions of the respective constituent elements. The computer program includes a combination of a plurality of codes indicating instructions according to which the computer is to operate to achieve the functions.

(2) Part or all of the constituent elements of the sound source probing apparatus or the like described above may be implemented in a single system LSI (Large Scale Integration). The system LSI is a super-multifunction LSI including a plurality of parts integrated on a single chip. More specifically, the system LSI is a computer system including a microprocessor, a ROM, a RAM, etc. In the RAM, a computer program is stored. The microprocessor operates according to the computer program such that the system LSI achieves its functions.

(3) Part or all of the constituent elements of the sound source probing apparatus or the like described above may be implemented in the form of an IC card attachable to various apparatuses or may be implemented in the form of a single module. The IC card or the module is a computer system including a microprocessor, a ROM, a RAM, etc. The IC card or the module may include the super-multifunction LSI described above. The microprocessor operates according to the computer program such that the IC card or the module achieve its functions. The IC card or the module may be tamper resistant.

The present disclosure may be applied to a sound source probing apparatus using a plurality of microphone units, and more particularly to a sound source probing apparatus capable of probing a direction of a sound source whose sound level at the microphone units is low compared with ambient sounds as in a case where the sound to be probed is a sound from a radio control helicopter or a drone located relative far from the sound source probing apparatus.

What is claimed is:

1. A sound source probing apparatus that probes a direction of a sound source, comprising:
    storage; and
    processing circuitry that, in operation, performs operations including
        determining a first correlation matrix that is a correlation matrix of acoustic signals acquired as observation signals by a microphone array including two or more microphones disposed apart from each other,
        determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in the storage, and
        determining, using the determined weights, a spatial spectrum of the observation signal indicating sound pressure intensities in the respective directions.

2. The sound source probing apparatus according to claim 1,
    wherein the operations further include
        selecting one first element from elements of the first correlation matrix and also selecting one second element from elements of each of the second correlation matrices such that each second element is at a matrix element position corresponding to a matrix element position of the first element, and
        sequentially changing the first element and the second elements by changing the matrix element position at which the first and second elements are selected, and
    wherein the determining of the weights includes
        updating the weights from first values to second values that allow a linear sum of the second elements multiplied by the respective second values of the weights to be equal to the first element,
        updating the weights from the second values to third values that allow a linear sum of next-selected second elements multiplied by the respective third values of the weights to be equal to a next-selected first element, and
        further repeating the updating of the values of the weights each time the first element and the second elements are changed thereby determining the weights.

3. The sound source probing apparatus according to claim 2,
    wherein in the selecting, the first element and the second elements are selected only from either one of two groups of elements of respective correlation matrices including the first correlation matrix and the second correlation matrices, the two groups of elements of each correlation matrix being defined such that the correlation matrix is divided into the two groups by a boundary defined by diagonal elements such that each group includes a plurality of elements but does not include the diagonal elements.

4. The sound source probing apparatus according to claim 1,
    wherein in the determining of the weights, the weights are determined based on the second correlation matrix and an error between the linear sum and the first correlation matrix using an LMS (Least Mean Square) algorithm or ICA (Independent Component Analysis).

5. The sound source probing apparatus according to claim 1,
    wherein the determining of the weights includes
        holding the weights,
        determining a linear sum of the products of the second correlation matrices and the respective held weights,
        determining an error defined by the difference between the linear sum and the first correlation matrix,
        determining weight change amounts from the error and the products of the second correlation matrices and the weights, and
        updating the weights by addling the weight change amounts to the respective held weights.

6. The sound source probing apparatus according to claim 5,
    wherein in the determining of the weights, the weight change amounts may be determined from the error and the second correlation matrices using an LMS algorithm or ICA.

7. The sound source probing apparatus according to claim 5,
    wherein the determining of the weights may further include adding nonlinearity to the error using a predetermined nonlinear function, and
    in the determining of the update amounts, the weight change amounts are determined from the error added with the nonlinearity and the second correlation matrices.

8. A method of probing a direction of a sound source, comprising:
    determining a first correlation matrix that is a correlation matrix of acoustic signals acquired as observation signals by a microphone array including two or more microphones disposed apart from each other;
    determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in storage, and determining, using the determined weights, a spatial spectrum of the observation signal indicating sound pressure intensities in the respective directions.

9. A computer-readable non-transitory storage medium storing a program for causing a computer to execute a method of probing a direction of a sound source, the program, when executed by the computer, causing the computer to execute the method including determining a first correlation matrix that is a correlation matrix of acoustic signals acquired as observation signals by a microphone array including two or more microphones disposed apart from each other, determining, by learning, weights such that a linear sum of a plurality of second correlation matrices multiplied by the respective weights is equal to the first correlation matrix where the plurality of second correlation matrices are correlation matrices, which are determined for respective directions determined based on an array arrangement of the microphone array and which are stored in advance in storage, and determining, using the determined weights, a spatial spectrum of the observation signal indicating sound pressure intensities in the respective directions.

* * * * *